Dec. 8, 1959      W. R. NIAL      2,916,230
SUPERSONIC AIRFOIL
Filed Jan. 14, 1948
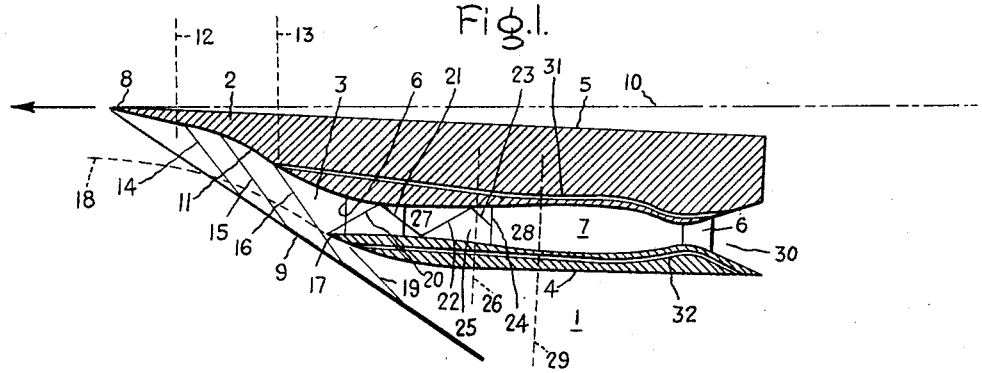
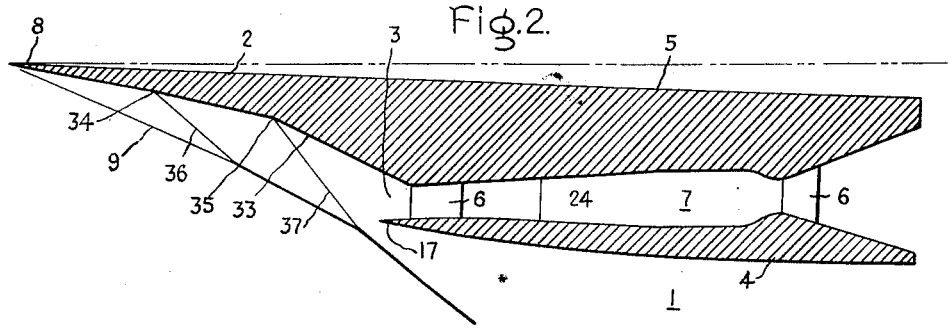
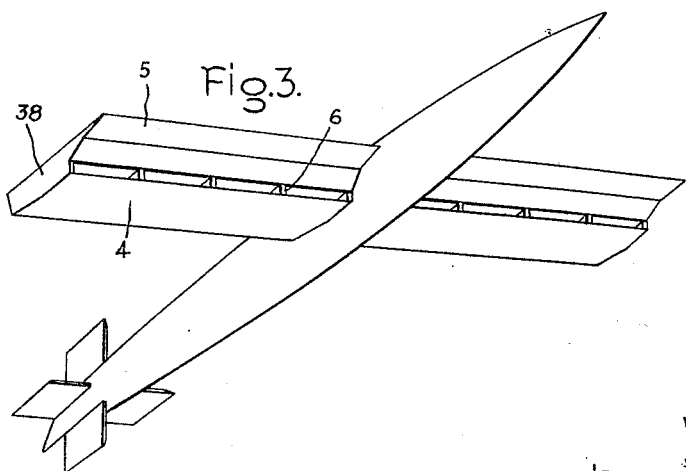
Inventor:
Walter R. Nial,
by Harry P. Mayers
His Attorney.

United States Patent Office 2,916,230
Patented Dec. 8, 1959

2,916,230

SUPERSONIC AIRFOIL

Walter R. Nial, Troy, N.Y., assignor to General Electric Company, a corporation of New York Application January 14, 1948, Serial No. 2,285

8 Claims. (Cl. 244—15)

This invention relates to airfoils, particularly those for aerodynamic devices, such as aircraft, moving at supersonic velocities (velocities greater than that of sound) through an elastic medium such as air. It has for its general object the provision of constructions affording greater lift by the use of certain characteristics of supersonic shock waves. It is a further object of the invention to provide constructions including improved diffuser mechanisms for increasing the elastic fluid pressure within a pressure chamber, such as an internal combustion or precombustion chamber within the device, the diffuser mechanism having an improved body configuration such that a desired pressure increase may be effected with relatively greater efficiencies and under conditions which remain stable throughout a greater range of operating conditions.

The features of the invention desired to be protected are set forth in the appended claims. The invention itself, together with further objects and advantages thereof may best be understood by reference to the following specification when taken in connection with the accompanying drawing in which the Figures 1 and 2 represent in schematic cross section exemplary embodiments of the invention in airfoils suitable for use in high speed aerodynamic craft such as ramjets or other air craft while Fig. 3 represents a perspective view of an airfoil embodying the Fig. 2 arrangement.

As is well known in the art to which the invention relates, airfoils of the aforementioned character include generally an aerodynamic lifting surface designed to develop in the surrounding medium a fluid pressure lifting force for the airfoil by virtue of its motion through the fluid medium and, in addition, may include a diffuser mechanism which has the general function of converting a portion of the kinetic energy inherent in the rapid relative motion between the fluid and the mechanism into useful pressure energy. The latter result may be obtained by appropriately designing the diffuser to effect a reduction of the initially rapid fluid flow (relative motion of the fluid with respect to the diffuser mechanism) to a relatively slow flow within a desired region such as a confined chamber within the diffuser. Such a chamber may, for example, comprise a combustion chamber or precombustion chamber of an internal combustion device which furnishes the driving force driving the airfoil through the fluid. Numerous types of diffuser designs are known in the art. However, in elementary and common form, a diffuser comprises simply a tube-like channel which guides the elastic flow and which has a cross section varying along the path of the flow whereby the resultant varying volumetric conditions within the fluid give rise to the desired pressure increase.

It is known that when the fluid velocity exceeds that of sound, the pressure conditions in and about the airfoil and also within the diffuser become affected by the phenomenon of shock waves. Shock waves may be considered to be disturbances in the fluid flow caused by sound waves emitted from irregularities of shape of the airfoil or diffuser body as a consequence of sudden changes in the direction of the fluid flow in the neighborhood of the irregularities. Generally, the shock wave emanating from a given irregular point may be viewed as the envelope of sound waves given off at the point and thus may be represented by a line extending in the direction of the flow and obliquely thereto at an angle proportional to the ratio of the speed of sound to the speed of flow. The angle will also be affected by the angle of the deflecting surface at the point of irregularity; that is, by the degree to which it tends to deflect the flow. This line may be thought of as a line of discontinuity in the pressure-velocity condition of the fluid since as the fluid passes through the shock wave its pressure, density and temperature are suddenly increased, that change taking place at the expense of the fluid velocity which is thereby decreased in the transition. The following expression derived from energy concepts may be used to represent the phenomena of the transition:

$$KE_1 + P_1 = KE_2 + P_2 + \text{losses} \qquad (1)$$

That is, the kinetic energy ($KE_1$) and pressure energy ($P_1$) ahead of the shock wave are equal to the kinetic energy ($KE_2$) and the pressure energy ($P_2$) after the shock wave plus any losses which may be incurred as the fluid passes through the shock wave discontinuity. These losses may be attributed to an extremely rapid deceleration of the fluid particles within the very small width of the shock waves (e.g. $\frac{1}{300}$ of a millimeter). That deceleration brings about friction between the molecular particles of the fluid which thereby convert some of the available velocity energy into heat losses. The larger the magnitude of the shock wave, that is, the larger the pressure rise across the wave becomes, the larger the loss factor will be.

While a pressure rise incident to a shock wave may be utilized for any desirable pressure effect, nevertheless since pressure rises created in this manner are inefficient because of the loss factor indicated by the expression 1, it has heretofore been a common practice to attempt to design all aerodynamic structures such as airfoils or diffusers, to eliminate shock waves altogether or at least to minimize their intensity. However, it is difficult if not impossible to effect complete elimination and therefore, it would be highly desirable to have designs for airfoils or diffusers which minimize the loss factor while at the same time taking advantage of the incident pressure rise. It is precisely this result which is effected by the improved airfoil diffuser configuration of the present invention.

Referring now to the Figure 1 there is shown in schematic cross section an exemplary embodiment of the invention within an airfoil suitable for use as the lifting surface and power source of a high speed aerodynamic craft such as a ramjet. The relative velocity between the airfoil and the surrounding air may be utilized to build up fluid pressure under the airfoil for lifting purposes and at the same time to build up useful pressure within a pressure chamber of an internal combustion device driving the craft. The airfoil may comprise any suitable streamlined body 1 designed to pass through the air with a minimum amount of drag and other disturbing forces and having a leading or nose portion 2, a fluid entrance channel 3 formed within the body 1, that is by the opposing walls of a lower portion 4 and an upper portion 5 maintained in fixed spaced relation by suitable means such as struts 6. At the trailing end of the channel 3, the channel flares outward into an enlarged region or chamber 7 in which it is desired to build up useful high pressure by diffusion processes in the preceding portion of the channel. The airfoil may be designed in any suitable shape, that is, the section shown in the Figure 1 may as indicated, constitute vertical cross section through a generally planar structure having generally planar portions 4 and 5.

It will be understood that as the craft in its general use travels through the surrounding air as a working fluid in the direction of the indicated arrow, the tip 8 of the leading or nose portion 2, that is the leading edge of the airfoil, will generate a shock wave as indicated by the illustrative line 9. Preferably the magnitude of this shock wave is small in order to minimize the losses generated therein and to this end the nose portion 2 in the vicinity of tip 8 is constructed to have a very narrow or sharp pointed edge which will create minimum disturbance of the air flow in its immediate vicinity. A small amount of the desired compression of the fluid is effected through this shock wave 9 while still minimizing the loss occurring therein. The pressure rise due to this compression when taken together with the hereinafter to be discussed pressure rises occurring at subsequent surfaces will, as will be apparent, aid in lifting the airfoil. In order to preclude the formation of a counterpart shock wave on the upper surface of the portion 5 of body 1 which might tend to neutralize the pressure lifting effects created by shock wave 9, the upper surface of the portion 5 is designed to have a positive angle of attack that is to say, the general contour of the upper surface extends at an angle below the normal direction of flight indicated by the arrow or its extension, line 10. Any positive angle will accomplish the desired result although I have illustrated an angle of about 3° for the purpose. It will be understood by those skilled in the art that under these circumstances there will be sufficient fluid expansion in or about the upper surface to preclude pressure rise in that general region.

For the purpose of effecting still further compression on the lower side of the body 1 before the fluid enters the channel 3, the portion of nose 2 following the vicinity of tip 8 may be designed to present a smooth gradually curving concave compression surface 11 (generally between the dotted lines 12 and 13). The surface 11, because of its gradual concave curvature along the direction of the flow, will give rise to what may be viewed as an infinite number of infinitesmal shock waves, termed shocklets, spaced along the direction of the flow and resulting in a gradual pressure rise in that direction. Such a series of shocklets may be indicated by a few representative lines 14, 15 and 16. These shocklets will intersect the shock wave 9 and deflect its course downward while at the same time increasing its magnitude (as indicated by the increasing thickness of the end portions of line 9). For best operation of the airfoil, it is preferable that the shock wave 9 after depression by the shocklets be positioned well ahead of the leading edge or tip 17 of the lower portion 5 in order that it not strike any point of the portion 5 and thereby be deflected into the channel 3. That is, the shock wave 9 should be outside the limiting streamline by the time it reaches the vicinity of the tip 17, i.e. outside of the dotted line 18 (called the streamline) representing a dividing line between the fluid flow which enters the channel 3 and that which flows below the portion 4. To that end, the angle at the tip 8, together with the length of the nose portion 2 ahead of the tip 17 and the curvature of the surface 11 are made of sufficient value to give that effect. The manner of proportioning these factors for the purpose will be readily understood by those skilled in the art. Because of the gradual curvature of compression surface 11, the fluid flow past it is made essentially lossless while at the same time a certain amount of desirable pressure increase occurs. This, of course, neglects loss due to friction at the various surfaces.

Farther downstream from the concave portion of the nose the fluid flow enters the channel 3 which is generally parallel to the axis of the airfoil and the tip 17 of the lower portion 4 causes the air to be abruptly turned at some angle which generates the shock waves 19 and 20. The angle of the latter shock waves may, of course, be predetermined by methods known to those skilled in the art. Shock wave 19 may add to shock wave 9 as in the case of shocklets 14, 15 and 16. In a manner described in, and by use of the methods and constructions claimed in application for U.S. Letters Patent Serial No. 746,168, now abandoned entitled Aerodynamic Diffuser Mechanisms filed May 5, 1947 by Robert H. Johnson and Walter R. Nial and assigned to the same assignee as the present application, the shock wave 20 may be caused to experience a multiple number of reflections 21, 22 and 23 between the walls of the channel 3 in the downstream direction until it terminates at a normal shock wave 24 just below the throat section 25 of the channel 3 (the throat section is the cross section at the point of narrowest constriction indicated generally by the dotted line 26). In this respect the entire channel 3 may be considered as being divided, ahead of chamber 7, into two sections one on either side of the throat section 25. The first may be termed a supersonic reflection or pressure chamber 27 between the normal shock wave 24 and tip 17 and on the upstream side of the throat section 25, and the second which may be termed the subsonic diffuser or pressure chamber 28 between the normal shock wave 24 and the position of about the dotted line 29 on the downstream side. After leaving the subsonic diffusion section the fluid flow will enter the combustion chamber 7 in a manner similar to that described in the aforementioned application. After admixture with a fuel within the combustion chamber and ignition of that mixture, the combustion products may be ejected in the usual manner through the outlet orifice 30 in order to propel the device in the known manner. Any suitable means for injecting the fuel may be used although for convenience of illustration and simplification of the drawing such is omitted.

It will be understood that for a predetermined desired speed or range of speeds of the craft, the configuration of both the airfoil and the diffuser channel can be designed to insure the proper stable position of the normal shock wave 24. Generally that is accomplished by appropriate shaping of the chambers 27, 28 and 7 so that at the predetermined speed, the resultant fluid pressures and velocities (design velocities) within those chambers will be of proper value to place and maintain the normal shock wave 24 at the desired point, such as slightly downstream from the throat section 25. It will be understood further that in operation, the fluid velocities in the diffuser may be varied throughout a limited range of decreasing velocities below the design velocity (for example, as a result of a decrease in the velocity of the craft in flight) without causing substantial change in the position of shock wave 24, i.e. without reaching the unstable condition wherein the normal shock wave 24 regurgitates upstream of throat 25 and moves completely out of the entrance of the channel 3. A corresponding range of increasing velocities is likewise permissible before excessive pressure drop in chamber 7 occurs. These ranges should obviously be as large as possible in order to provide maximum stability of normal shock wave 24 and proper combustion chamber pressure throughout a wide range of operational velocities. If desired, the permissible operating range and the overall efficiency may be further enhanced by use of means for temporarily increasing the effective wall area of the channel 3 to permit greater fluid flow during temporary periods of low speed in the craft. For example, there may be used to the latter end the methods and means described and claimed in the copending application Serial No. 780,498 entitled Aerodynamic Diffuser Mechanisms filed October 17, 1947 by Robert H. Johnson and Walter R. Nial and assigned to the same assignee as the present invention.

The foregoing diffuser construction will be found to have one further advantage in contrast to prior art types of airfoils employing diffuser channels. In prior art mechanisms it has been customary to employ a diffusion channel both on the upper and lower side of the airfoil or, in any event, in some configuration symmetrical about a longitudinal axis of the airfoil. With the latter, any change in the angle of attack of the airfoil tends to cause a stronger internal shock wave in the upper diffusion channel and a weaker internal shock wave in the lower one. This changes the internal flow pattern considerably and often leads to choking of the diffuser system and consequently lower mass flow therethrough, lower pressure recovery and lower efficiency. This difficulty is not encountered with the configuration shown in the Figure 1 since an increase or change in the angle of attack will have an effect only on the single shock wave and will not therefore have as disturbing an effect on the overall operation.

It may be found that under certain conditions of design and operation a region of excessive air drag will occur in the vicinity of the surface 11. In that region there will be a tendency for the air to become relatively still and thus interfere with the normal desired operation of the fluid flow pattern. As one possible means of overcoming the effects of this condition, the duct 31 may be provided to remove from the immediate vicinity of the surface 11 a substantial portion of this still air and permit that air to flow backward through the foil body whereupon it is either exhausted, unused, or may be used for cooling the walls of the combustion chamber 7 where such is desired. The duct 31 will therefore have the dual function of permitting the desired fluid flow pattern to be accelerated in the close proximity to the surface 11 and at the same time will utilize the air thus drawn off for a useful purpose. It will be understood that duct 31 may be constructed in many forms. Thus it may be a wide flat channel or a series of smaller pipe-like channels running from the front to rear of the airfoil. A similar duct or ducts 32 may be provided in portion 4 to enhance cooling if desired.

It will be understood, of course, that it is not essential, although preferable, that the reflecting type of diffusion chamber shown in the Figure 1 be utilized. Any of the other diffuser configurations known in the art may be utilized for example, the simple type in which the shock waves in the vicinity of the inlet channel 3 are eliminated and diffusion takes place without the benefit thereof.

In the Figure 2 there is shown a structure alternative to that of the Figure 1 which differs only in that the pressure build up for the purpose of adding lift to the airfoil is generated not by means of the continuously curving compression surface 11 of the Figure 1 but rather by the discontinuous or step-wise configured surface 33 which has one or a plurality of discontinuities or abrupt turns 34 and 35 defining mutually, angularly offset segments, each generating a secondary shock wave 36 and 37 respectively which add to form a main shock wave 9 affording the desired pressure rise. In view of the similarity of this construction to that of Figure 1 like numerals have been used to designate like parts throughout.

In the Figure 3 there is shown a perspective view of an aircraft employing an airfoil constructed in accordance with the Figure 2. It will be understood that a very similar construction will apply to the Figure 1. In the Figure 3 the portions 5 and 4 forming the upper and lower surface of the airfoil are shown as being held in rigid juxtaposition by means of the struts 6 as well as by the end structure 38.

While I have shown and described a particular embodiment of my invention, it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States is:

1. An airfoil adapted to guide the flow of elastic fluid past said airfoil during flight thereof in a predetermined direction comprising an upper portion spaced above a lower portion, the upper surface of said upper portion being substantially planar and extending rearwardly along said airfoil at an angle below the line of said predetermined direction, said lower portion having a lower surface substantially parallel to said upper surface, said upper portion having a leading portion disposed upstream of said lower portion, said upper and lower portions having opposing surfaces defining a diffusion channel adapted to receive a portion of the fluid flow passing under the leading portion of said upper portion, said channel having in the order named in the downstream direction an inlet orifice, a supersonic section of decreasing flow area, a throat section of minimum flow area, and a subsonic flow section of increasing flow area.

2. An airfoil as in claim 1 in which said leading portion comprises a leading edge arranged to generate a shock wave directed under said lower portion, and a compression surface extending rearwardly and downwardly from said edge and arranged to increase the pressure of fluid flow under said upper portion.

3. An airfoil as in claim 2 in which said compression surface comprises a concave surface extending rearwardly and downwardly from said leading edge and arranged to increase the pressure of fluid flow under said upper portion.

4. An airfoil as in claim 1 in which said leading portion comprises a leading edge arranged to generate a shock wave directed under said lower portion, and a compression surface extending rearwardly and downwardly from said edge and arranged to increase the pressure of fluid flow under said upper portion, said compression surface comprising a plurality of mutually, angularly offset segments arranged to generate secondary shock waves directed under said lower portion.

5. An airfoil adapted to guide the flow of elastic fluid past said airfoil during flight thereof in a predetermined direction comprising an upper portion spaced above a lower portion, the upper surface of said upper portion being substantially planar and extending rearwardly along said airfoil at an angle below the line of said predetermined direction, said lower portion having a lower surface substantially parallel to said upper surface, said upper portion having a leading portion disposed upstream of said lower portion, the leading portion of said upper portion comprising a leading edge arranged to generate at predetermined flight velocities a shock wave directed under the lower portions whereby pressure rise incident to said shock wave furnishes a lifting force for said airfoil, said upper and lower portion having opposing surfaces defining a diffusion channel adapted to receive a portion of the flow of fluid passing under said leading portion of said upper portion and through said shock wave, said channel having in the order named in the downstream direction an inlet orifice disposed downstream of the normal position of said shock wave, a supersonic section of decreasing flow area, a throat section of minimum flow area, and a subsonic flow section of increasing flow area, said diffusion channel being arranged to effect a further compression of the fluid directed therethrough, the pressure of which fluid is initially increased by passing through said shock wave.

6. An airfoil as in claim 5 in which said leading portion comprises a leading edge arranged to generate a shock wave directed under said lower portion, and a compression surface extending rearwardly and downwardly from said edge and arranged to increase the pressure of fluid flow under said upper portion.

7. An airfoil as in claim 6 in which said compression surface comprises a concave surface extending rearwardly and downwardly from said leading edge and arranged to increase the pressure of fluid flow under said upper portion.

8. An airfoil as in claim 5 in which said leading portion comprises a leading edge arranged to generate a shock wave directed under said lower portion, and a compression surface extending rearwardly and downwardly from said edge and arranged to increase the pressure of fluid flow under said upper portion, said compression surface comprising a plurality of mutually, angularly offset segments arranged to generate secondary shock waves directed under said lower portion.

References Cited in the file of this patent

UNITED STATES PATENTS

| 1,180,271 | Tarbox | Apr. 18, 1916 |
| 1,559,091 | Hall | Oct. 27, 1925 |
| 2,126,502 | Redlinger | Aug. 9, 1938 |
| 2,447,100 | Stalker | Aug. 17, 1948 |

FOREIGN PATENTS

| 579,758 | Great Britain | Aug. 14, 1946 |

OTHER REFERENCES

N.A.C.A. Technical Note 1316, June 1947. (Copy in 244–35.6.)